TEMPORARY NOTICE of BEST AVAILABLE IMAGE

U. S. PATENT AND TRADEMARK OFFICE

THE SCANNED IMAGES OF PATENT NUMBER 1400½ FOR THE ISSUE DATE OF 11/9/1839 ARE NOT THE COMPLETE ORIGINAL DOCUMENT, BUT CONTAIN A COPY OF THE BEST AVAILABLE TEXT AND IMAGE DATA FROM VARIOUS SOURCES.

WHEN THE MISSING INFORMATION BECOMES AVAILABLE, THE DOCUMENT WILL BE RESCANNED AND REPLACED.

ANY QUESTIONS SHOULD BE DIRECTED TO THE DATA MAINTENANCE BRANCH BY TELEPHONE AT (703) 306-3116.

TEMPORARY NOTICE of BEST AVAILABLE IMAGE

UNITED STATES PATENT OFFICE.

HENRY KING, OF BALTIMORE, MARYLAND.

IMPROVED BLUE FLUID FOR WRITING.

Specification forming part of Letters Patent No. 1,400½, dated November 9, 1839.

*To all whom it may concern:*

Be it known that I, HENRY KING, of Baltimore, in the county of Baltimore and State of Maryland, have invented a new and Improved Mode of Manufacturing Blue Writing-Fluid; and I do hereby declare the following is a full and exact description.

To enable others skilled in the art to make and use my invention, I will proceed to describe its composition and operation.

First. Take indigo, powdered, two and one-half ounces; sulphuric acid, one pound. Mix them, and stir with a glass rod occasionally until the indigo is dissolved.

Second. Take nut-galls Aleppo, one ounce; alum, three drams; boiling water, one pint. Mix and let stand twenty-four hours, or until the precipitate settles; then filter.

Take mixture first, put it in a glass or stone vessel, add sixteen ounces of water; then gradually add carbonate of lime, four pounds, or a sufficient quantity to neutralize the acid; then add seven pints of water; pour off and filter; then add mixture second, and to each ounce of the fluid add one grain sulphate of iron.

To manufacture the changeable blue writing-fluid, take one gallon of the blue fluid already prepared and add to it mixture No. 2, then to each ounce add nine grains sulphate of iron, and filter.

What I claim as my invention, and desire to secure by Letters Patent, is—

The combination of the ingredients herein specified, so as to form a blue writing-fluid, the same being combined in the manner set forth.

HENRY KING.

Witnesses:

JOHN S. HARROD,
DAVID W. B. HARROD.